Nov. 12, 1957  I. L. LA COUR  2,813,239
TWO-SPEED SINGLE-PHASE MOTORS
Filed March 11, 1954  4 Sheets-Sheet 1

I. L. LaCour
INVENTOR.

BY Wenderoth, Lind & Ponack
ATTYS.

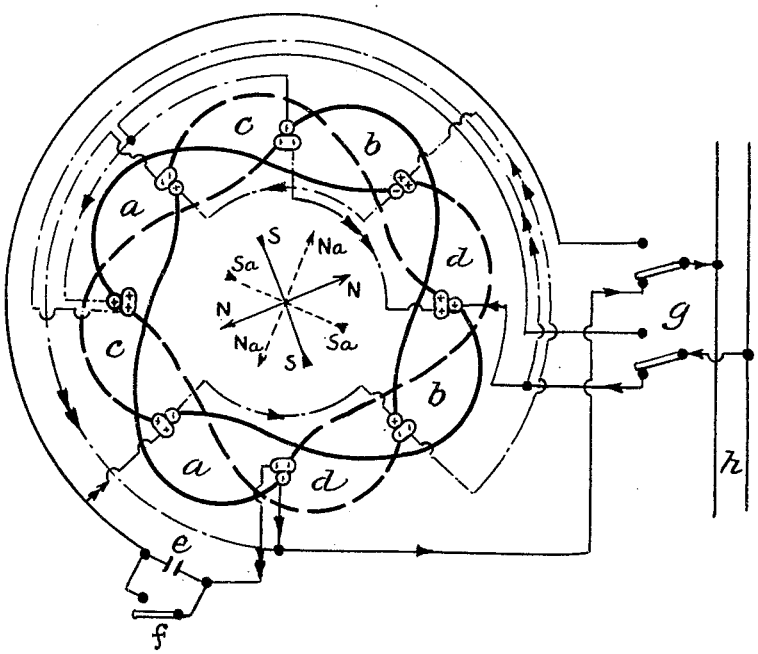
Fig. 1ª

Nov. 12, 1957

I. L. LA COUR 2,813,239

TWO-SPEED SINGLE-PHASE MOTORS

Filed March 11, 1954

I. L. LaCour
INVENTOR.

BY Wenderoth, Lind & Ponack

ATTYS.

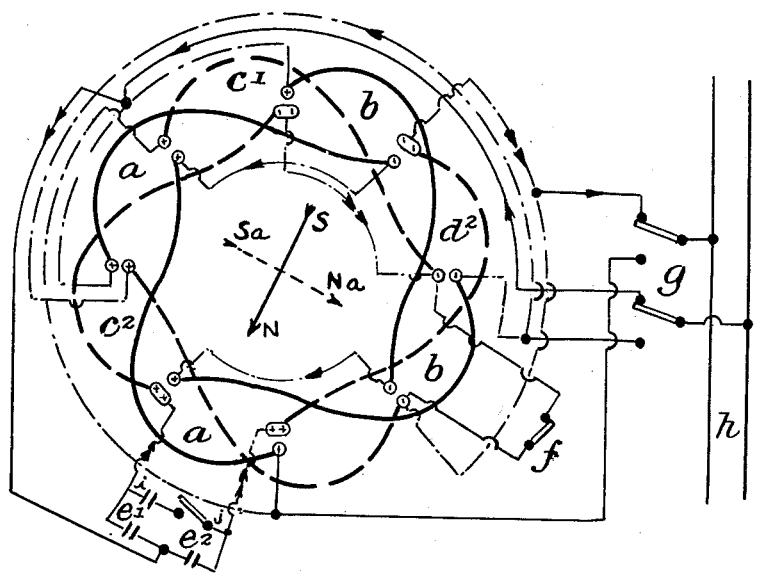
Fig. 4ᵃ

United States Patent Office 2,813,239
Patented Nov. 12, 1957

2,813,239

TWO-SPEED SINGLE-PHASE MOTORS

Iens Lassen La Cour, Halsingborg, Sweden, assignor to Aktiebolaget Scania-Verktyg, Halsingborg, Sweden, a corporation of Sweden Application May 11, 1954, Serial No. 429,089

Claims priority, application Sweden May 21, 1953

3 Claims. (Cl. 318—221)

The present invention relates to two-speed single-phase electric motors.

In single-phase electric motors capable of being run at two different rated speeds, the necessary adjustment of the motors for either speed is usually accomplished by rearranging the connections of the stator windings so as to change the number of poles in a relation of 1 to 2. A disadvantage inherent in this type of motor, in the forms thereof as proposed up to now, is that it does not impart equally favorable characteristics to the motor both at the higher and at the lower number of poles but tends to make the characteristics better at one or the other number of poles.

The principal object of the present invention is to provide an improved two-speed single-phase motor in which the above disadvantage is avoided to a substantial extent, the motor operating almost equally favorably at both numbers of poles.

This object is attained by providing a two-speed single-phase motor having its stator windings arranged for changing the number of poles in the relation of 1 to 2, said motor being characterized by said stator windings including a main winding composed of two equal groups of coils and an auxiliary winding also composed of two equal groups of coils, the arrangement of said groups of coils being such that, at the higher number of poles, the groups of the main winding are connected in series, the said main winding functioning as a working winding, and the groups of the auxiliary winding are magnetically in quadrature with the groups of the main winding, said auxiliary winding functioning as a starting winding, while, at the lower number of poles, each group of coils of the main winding is connected in series with the whole or a part of each group of coils of the auxiliary winding and the two winding assemblies thereby obtained are connected in parallel across the line terminals to function as working windings.

The said and other objects and advantages of the invention will be set forth with greater particularity in the following description with reference to the accompanying drawings, in which:

Fig. 1a is a winding diagram corresponding to Fig. 1 and showing the motor connected as a four pole motor;

Fig. 4a is a winding diagram similar to that in Figs. 1a and 1b but showing the windings connected in accordance with Fig. 4, for two poles;

Figure 1:
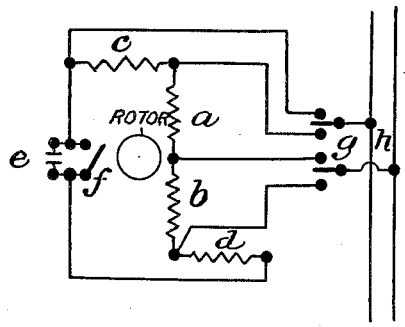
Fig. 1 is a circuit diagram of a single-phase motor according to the invention in one embodiment thereof.

Referring to the drawings, the diagram of Fig. 1 illustrates a single phase motor having a main winding and an auxiliary winding each divided in two parts of the same size and connected as shown. Here $a$ and $b$ are the two parts of the main winding, while $c$ and $d$ are the two parts of the auxiliary winding, which at the higher number of poles (as shown) is in quadrature with the main winding, so that the auxiliary winding can be used for starting the motor. The starting characteristics are when the windings are connected for the higher number of poles. In Fig. 1, therefore, a condenser $e$ is connected, for starting, in series with the two parts $c$ and $d$ of the auxiliary winding, while the main winding can, through the two-pole changeover switch $g$, be connected to the line $h$. By turning the pole-changing switch $g$ to the connections for the lower number of poles, the part $a$ of the main winding is connected in series with the part $c$ of the auxiliary winding and in the same way the part $b$ of the main winding is connected in series with part $d$ of the auxiliary winding. These two assemblies of series-connected parts are, at the lower number of poles, equal in size and magnetically in phase and thus can be connected in parallel through the switch $f$ at the same time as the pole-changing switch $g$ turns from connections for the higher to the lower number of poles; hence the two parallel circuits may be connected as a working winding to the line. Naturally equipotential points in these two circuits, as for instance the terminals of the main windings $a$ and $b$, may also be connected together without altering anything in the function of the windings.

The higher number of poles is obtained, when the two pole changeover switch $g$ in the figure is turned downwards, whereby the main winding $a$—$b$ is connected directly to the line $h$, while the auxiliary winding $c$—$d$ in series with the starting condenser is at the same time also connected to the line $h$.

The lower number of poles is obtained, when the two pole changeover switch $g$ is turned upwards and the short-circuiting switch $f$ is simultaneously closed, whereby the part $a$ of the main winding is connected in series with the part $c$ of the auxiliary winding across the line $h$ and the part $b$ of the main winding is connected in the same way in series with the part $d$ of the auxiliary winding. These two circuits are thus connected directly to the line $h$.

In Fig. 1, as well as in the following Figures 2 to 5 to be described later, the windings are diagrammatically arranged mainly in accordance with the phase of the voltages induced in them in the case of the connection for the higher number of poles.

The winding diagram in Fig. 1a illustrates the stator winding arrangement in the case of a motor with two or four poles. The figure is based on the circuit diagram in Fig. 1, with the switch $g$ turned downwards and the motor thus connected to have four poles. The stator is assumed to have eight slots and only one complete symmetrical winding with eight coils as an ordinary polyphase motor for two double phases, of which the coils $a$ and $b$ form one double phase and the coils $c$ and $d$ form the other. Both phases are carried out with the same winding pitch lying between $\tau$ and $2\tau$, where $\tau$ is the pole pitch for the higher number of poles. However, both phases need not always be carried out with the same number of coils and with the same number of conductors per coil.

The current flowing through the coils is in the conventional way indicated by one minus sign (—) indicating an instantaneous current in the main winding $a$ and $b$ coming out towards the reader and two minus signs (— —) indicating an instantaneous current in the auxiliary winding $c$ and $d$ also coming out toward the reader. One and two plus signs (+ and ++, respectively) indicate currents in the opposite direction. One or two arrow heads on the leads indicate the flow of the currents therein. With the currents flowing as shown in Fig. 1a the current in the coils a and b creates the four main poles N and S, while the current in the auxiliary coils c and d, which is 90 electrical degrees ahead of the current in the main coils, creates the four auxiliary poles Na and Sa, which causes the motor to rotate clockwise.

Figure 1B:
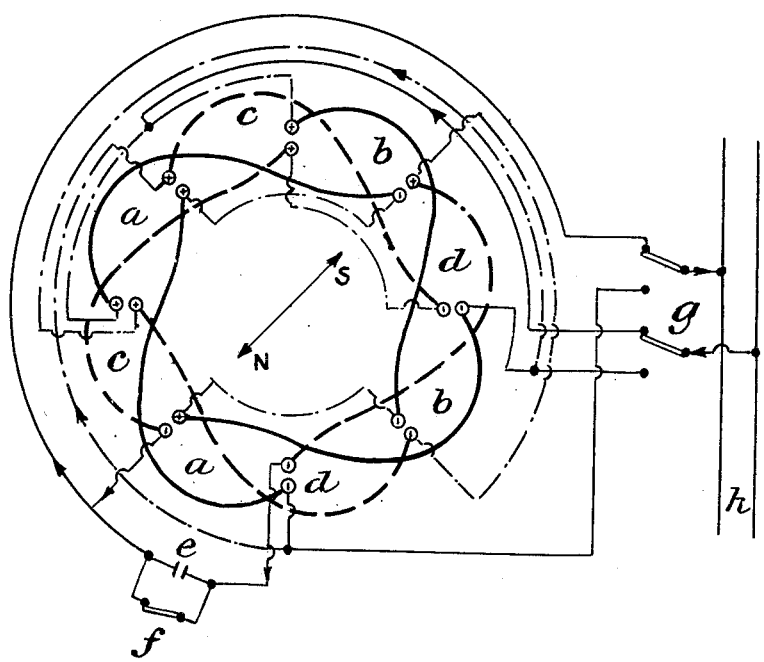
Fig. 1b is a winding diagram similar to Fig. 1a and showing the motor connected as a two pole motor.

The winding diagram in Fig. 1b is similar to Fig. 1a but shows the switch g turned upwards to provide the stator winding arrangement required for a two pole motor. With the currents flowing as shown in Fig. 1b, they are effective in all the coils to form the poles N and S, inducing the same voltage, in respect of both magnitude and phase, in the coils a and c as well as in the coils b and d. The two assemblies of coils a, c and b, d, therefore, can be connected in parallel.

The motor of Fig. 1 is started as a low speed four pole motor. After the motor gains speed, the switch g is turned upwards to convert the motor into a high speed two pole motor. This causes the motor to increase its speed to the value set by the winding arrangement in this case.

As is well-known, in the case of ordinary three phase pole changing motors, the relation between the magnetic fluxes as well as between the maximum power outputs is preferably $\sqrt{2}$ to 1, since this makes the best utilization of the stator iron structure possible and suits the usual requirements of machine tools best. The same considerations apply in the case of the single-phase motor according to the present invention, which is therefore made to satisfy the above condition, thereby enabling the use of ordinary polyphase motor stator structures, as will now be described.

If, as is otherwise usual, the same main winding a—b had been utilized for both numbers of poles, then there would have been two coils in series in the case of a two pole arrangement and four coils in series in the case of a four pole arrangement, so that the magnetic flux would have been twice as large for two poles (Fig. 1b) as it would for four poles (Fig. 1a). This would have involved an ungainly stator core. For this reason, in the case of the present invention, the coils a are connected in series with the coils c and the coils b likewise connected in series with the coils d to provide a two pole motor, as shown in Figs. 1 and 1b. This means that there are effectively three coils in series in the two pole case, as clearly seen in Fig. 1b, while there are four coils in series in the four pole case, as seen in Fig. 1a, so that the ratio of the magnetic flux in the two pole case to that in the four pole case is approximately $4/3=1.33$.

The reactanes of the main windings at the two different numbers of poles are proportional to the effective number of coils in series in Fig. 1a and Fig. 1b, respectively, i. e. 4 and 3, respectively. Hence, the maximum power output for the two pole winding arrangement is also about 1.33 larger than the maximum power output for the four pole winding arrangement. The present motor thus has equally good characteristics and can give the same power output as the ordinary polyphase pole-changing motors.

Figure 2:
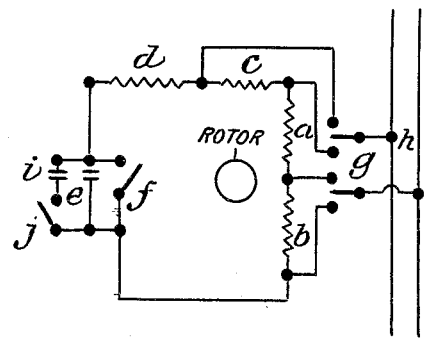
Fig. 2 is a circuit diagram of a single-phase motor only slightly modified from that of Fig. 1.

Fig. 2 shows the same arrangement as Fig. 1 slightly modified, two condensers e and i being connected in parallel instead of a single condenser e at the higher number of poles. The condenser i is operative during starting only, being disconnected by a switch j shortly after starting. The condenser e is short-circuited by the switch f at the lower number of poles. In Fig. 2 the two parts of the auxiliary winding are diagrammatically shown beside one another, but this does not alter anything in the function and action of the arrangement.

As is well-known, condensers in series with auxiliary windings give the greatest starting torques and may remain in circuit at full speed if not too large. On the other hand, if one chooses so large a condenser that the starting torque becomes nearly as high as that of a polyphase motor, then it will be necessary at full speed to reduce the condenser capacity considerably, which is most easily obtained by using two condensers in parallel, one e for full speed and an additional condenser i, as shown in Fig. 2, for starting, which shortly after starting is disconnected by the switch j.

Figure 3:
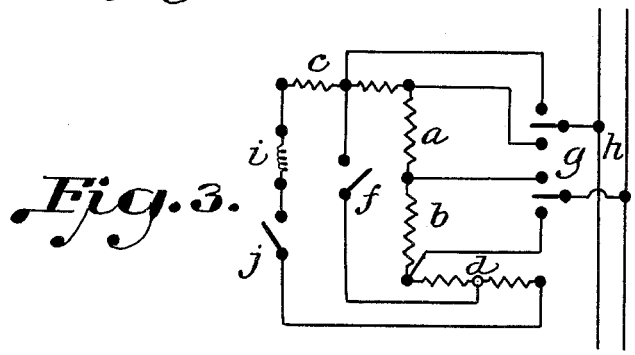
Fig. 3 is a circuit diagram of a still further modified form of the motor.

As proved by Tesla as early as 1889, single-phase motors may also be started by connecting a disconnectable choke coil or an ohmic resistance in series with the auxiliary winding, which, for example is shown in Fig. 3. Such a choke coil may be substituted for the condenser e in Figs. 1 and 2. However, this arrangement is of very little real value compared with the condenser start.

In Figs. 1 and 2 the two parts of the auxiliary winding are, in the connection for the lower number of poles, in their entirety connected in series with each part of the main winding thereby to reduce the magnetic flux and the maximum power for the lower number of poles compared with those for the higher number of poles. If, on the other hand, a small increase in the flux and power output at the lower number of poles is desirable, then it will only be necessary to connect a portion instead of the whole of the two parts of the auxiliary winding in series with each part of the main winding, as shown in Fig. 3, while the switch f has the same function as in Figs. 1 and 2.

By connecting a suitable number of coils of the auxiliary winding e and d in series with each part of the main winding a and b it will then be possible to produce precisely the desired relation between the fluxes and the maximum power outputs for the two numbers of poles.

As mentioned above, in the arrangement shown in Fig. 3, at the lower number of poles, only portions of the parts c and d of the auxiliary windings are connected in series with each part a and b of the main winding, while the other portions only come into function as parts of the starting winding at the connection for the higher number of poles. These latter portions therefore can preferably be carried out with a greater number of conductors per slot than the other portions of the auxiliary winding, which are connected in series with the main winding. Thereby the number of turns in the starting winding at the higher number of poles is increased, and thus the necessary condenser capacity $e+i$ for a certain starting torque may be considerably reduced.

Figure 4:
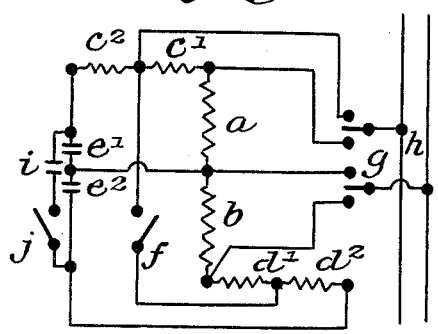
Fig. 4 is a circuit diagram illustrating a further development of the motor shown in Fig. 3.

In Fig. 4 is shown an arrangement, where a and b indicate the two parts of the main winding, while $c_1$, $c_2$, $d_1$ and $d_2$ indicate the four parts of the auxiliary winding at the higher number of poles, of which $c_2$ and $d_2$ are formed with a larger number of conductors per slot than $c_1$ and $d_1$. $e_1$ and $e_2$ are two condensers, connected in series, which may be operative at full speed, while i is an additional condenser for starting, which afterwards, if necessary, may be disconnected by the switch j. f and g are the switches necessary for the pole changing, while h indicates the line.

As the auxiliary windings c and d, considered in their entirety, at the higher number of poles are in quadrature with the main windings a and b, then c and d, at the lower number of poles, will only be 45 electrical degrees displaced in phase from the main windings a and b. When, as above in Fig. 3, every part of the auxiliary winding is divided into two different portions, then it will thereby be possible to arrange these portions magnetically in such a way that $c_1$ and $d_1$ will be practically in phase with the main winding, while $c_2$ and $d_2$ will be practically in quadrature with the main winding at the lower number of poles.

Referring now to Fig. 4a, a similar stator winding diagram as in Figs. 1a and 1b is shown, the winding connections corresponding to the circuit diagram in Fig. 4, when the switch $g$ is turned upwards and the lower number of poles thus established. Here the two coils $a$ are connected in series with coil $c_1$ and the two coils $b$ connected in series with coil $d_1$. These two circuits are then connected in parallel and act as a working winding. The currents flowing through the said coils are indicated similarly as in Figs. 1$a$ and 1$b$ and create the two main poles N and S. The coils $c_2$ and $d_2$ connected in parallel act as an auxiliary winding, and the condenser currents flowing therein create the auxiliary poles N$a$ and S$a$, which as Fig. 4$a$ shows are in quadrature with the main poles N and S and cause the rotor to rotate clockwise as in Fig. 1$a$.

As $c_2$ and $d_2$ can be formed with a large number of conductors per slot, this construction being indicated in the figure by the $++$ and $--$ at the ends of $c_2$ and $d_2$ as compared to only $+$ and $-$ at the ends of $c_1$ and $d_1$, they will perform well as starting windings for the lower number of poles, which facilitates the motor passing from the lower to the higher speed and also makes starting from a standstill possible even at the lower number of poles. For this purpose the condenser $e$ is as shown divided into two parts $e_1$ and $e_2$, which, at the higher number of poles, are connected in series and at the lower number of poles are in parallel, so that the same condensers may be used for starting at both numbers of poles.

In Fig. 4$a$ the main winding has three effective coils in series, while the main winding in Fig. 1$a$ has four coils in series, as already mentioned, so that the two pole flux is about $4/3=1.33$ times greater than the four pole flux. With regard to the reactances, the main winding in Fig. 4$a$ has only 2½ effective coils, while the main winding in Fig. 1$a$ has 4 effective coils. Hence, the maximum power output for the two pole connection is about $4/2.5=1.6$ times greater than the maximum power output for the four pole connection.

Figure 5:
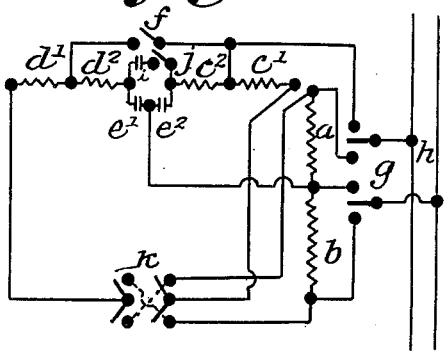
Fig. 5 is a circuit diagram of a reversible motor similar to that shown in Fig. 4.

Fig. 5 shows a similar arrangement as Fig. 4, but this being intended for a reversible motor, the auxiliary winding parts $c$ and $d$ are placed beside one another as in Fig. 3, so that it is possible, for reversing the rotation, to reverse the auxiliary winding instead of the main winding, which naturally would have had the same effect. $k$ indicates an ordinary two pole changeover switch for reversing the auxiliary winding. $f$ and $g$ can be combined into one apparatus to a pole-changing switch, and for this purpose an ordinary three-phase pole-changing switch can be used. Furthermore $k$ can also be combined with $f$ and $g$, and for this purpose an ordinary reversible three-phase pole-changing switch with five positions can be used. The arrangements described above, therefore, require no specially designed starting or pole-changing apparatus and no special motor core, hence they are cheap in manufacture.

The above described arrangements can be applied to single phase motors having rotors of the squirrel-cage type or of the slip-ring type or to a repulsion motor having a winding, connected to a commutator, short-circuited by brushes.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. In a two-speed single-phase motor, the combination of a stator having stator windings including a main winding composed of two equal groups of coils and an auxiliary winding also composed of two equal groups of coils, and means for connecting said windings alternatively to provide two different numbers of poles having a relation of 1 to 2 one of which has the groups of coils of said main winding in series to function as a working winding and the groups of coils of said auxiliary winding also in series to function as a starting winding, said lastmentioned groups of coils being magnetically in quadrature with said groups of coils of the main winding, whereby the higher number of poles is obtained, and the other of which has each group of coils of the main winding in series with at least part of each group of coils of the auxiliary winding, the assemblies of series connected windings being connected in parallel across line terminals to function as working windings, whereby the lower number of poles is obtained.

2. In a two-speed single-phase motor, the combination of a stator having stator windings including a main winding composed of two equal groups of coils and an auxiliary winding also composed of two equal groups of coils, and means for connecting said windings alternatively to provide two different numbers of poles having a relation of 1 to 2 one of which has the groups of coils of said main winding in series to function as a working winding and the groups of coils of said auxiliary winding also in series to function as a starting winding, said lastmentioned groups of coils being magnetically in quadrature with said groups of coils of the main winding, whereby the higher number of poles is obtained, and the other of which has each group of coils of the main winding in series with part of each group of coils of the auxiliary winding, each of said parts of each group having a lesser number of conductors per slot than the remaining part of said lastmentioned group of coils, the assemblies of series connected windings being connected in parallel across the line terminals to function as working windings, whereby the lower number of poles is obtained.

3. In a two-speed single-phase motor, the combination of a stator having stator windings including a main winding composed of two equal groups of coils and an auxiliary winding also composed of two equal groups of coils, and means for connecting said windings alternatively to provide two different numbers of poles having a relation of 1 to 2 one of which has the groups of coils of said main winding in series to function as a working winding and the groups of coils of said auxiliary winding also in series to function as a starting winding, said lastmentioned groups of coils being magnetically in quadrature with said groups of coils of the main winding, whereby the higher number of poles is obtained, and the other of which has each group of coils of the main winding in series with part of each group of coils of the auxiliary winding, the remaining part of each of said lastmentioned groups of coils being arranged practically in quadrature magnetically with said groups of coils of the main winding, the assemblies of series connected windings being connected in parallel across the line terminals to function as working windings, whereby the lower number of poles is obtained.

References Cited in the file of this patent

UNITED STATES PATENTS

| Number | Name | Date |
|---|---|---|
| 1,170,618 | Dudley | Feb. 8, 1916 |
| 1,189,296 | Scheibe | July 4, 1916 |
| 1,859,368 | Kennedy | May 24, 1932 |
| 1,867,328 | Rienks | July 12, 1932 |
| 1,870,272 | Weichsel | Aug. 9, 1932 |
| 1,912,337 | Kennedy | May 30, 1933 |
| 2,033,525 | Kennedy | May 10, 1936 |
| 2,671,879 | Schwartz | May 9, 1954 |

FOREIGN PATENTS

| Number | Country | Date |
|---|---|---|
| 277,790 | Switzerland | Dec. 17, 1951 |